United States Patent [19]

Ueno

[11] Patent Number: 4,548,520

[45] Date of Patent: Oct. 22, 1985

[54] ELECTRONIC TYPEWRITER

[75] Inventor: Hideo Ueno, Nagoya, Japan

[73] Assignee: Brother Kogyo Kabushiki Kaisha, Nagoya, Japan

[21] Appl. No.: 598,897

[22] Filed: Apr. 10, 1984

[30] Foreign Application Priority Data

Apr. 12, 1983 [JP] Japan .................................. 58-64996

[51] Int. Cl.$^4$ .......................... B41J 5/44; G06K 3/00

[52] U.S. Cl. ..................................... 400/63; 400/279; 364/518

[58] Field of Search ....................... 364/518, 519, 523; 400/279, 280, 63, 76, 61, 62

[56] References Cited

U.S. PATENT DOCUMENTS

| | | | |
|---|---|---|---|
| 3,579,193 | 5/1971 | Bernier et al. | 400/279 X |
| 3,618,032 | 11/1971 | Goldsberry et al. | 400/63 X |
| 3,823,389 | 7/1974 | Heitman et al. | 400/63 X |
| 3,885,663 | 5/1975 | Suzuki | 400/279 |
| 4,067,430 | 1/1978 | Wienhold | 400/279 X |
| 4,323,315 | 4/1982 | Demonte et al. | 400/63 |

OTHER PUBLICATIONS

IBM Tech. Disc. Bulletin, Chang, I. F., "Electron-Beam Addressable Liquid-Crystal Display with Storage Capability", vol. 16, No. 1, Jun. 1973, pp. 353-354.

*Primary Examiner*—Edgar S. Burr
*Assistant Examiner*—James R. McDaniel
*Attorney, Agent, or Firm*—Moonray Kojima

[57] ABSTRACT

Data entered from a keyboard is displayed sequentially on a display unit, while the data which has overflowed the display unit, is printed out by a printer having a print head. The print head is capable of being shifted in a normal direction through operation of a special key provided on the keyboard, without changing the data displayed on the display unit.

5 Claims, 3 Drawing Figures

ELECTRONIC TYPEWRITER

BACKGROUND OF THE INVENTION

1. Field of Invention

This invention relates to an electronic typewriter having a memory for storing entered data sequentially and a display unit for displaying the data stored in the memory, and more particularly, to an electronic typewriter which is capable of printing out on a recording sheet with a printer, data which has overflowed from the memory.

2. Description of Prior Art

In the above mentioned typewriter, characters which are indicated on the display unit are not printed on a recording sheet. Thus, when a typing error is noticed early, printing of the error is avoided by correcting the erroneous character at the time the error is displayed on the display unit.

In such typewriters, there are occasions when the margin setting or tab setting is desired to be changed while the document is being created. In that case, when a space key is operated to move the print head to a desired position, spacing data is stored in the memory, as a printing data. Accordingly, the desired margin setting position or tab setting position needs to be determined by adding the number of data stored in the memory (number of times the space key is operated) to the present position of the print head. This procedure, disadvantageously, has proven to be inconvenient.

Furthermore, disadvantageously, such typewriters do not have the capacity to shift data, which are already stored in the memory, all together toward a position at the right margin. Thus, the shifting of paragraphs or the centering of data stored in the memory has been, heretofore, impossible. When such paragraph shifting or centering of data is required, the space key or tab setting key must be operated after the memory has been cleared, and then the same data which was cleared from the memory must again be re-entered therein.

SUMMARY OF THE INVENTION

Accordingly, an object of the invention is to improve the prior art and to overcome the aforementioned and other deficiencies and disadvantages of the prior art.

Another object is to provide an electronic typewriter wherein a carriage carrying a print head is capable of being moved directly without affecting data stored in the memory.

A further object is to provide an electronic typewriter which is capable of providing a special carriage shift instruction which is not stored in the memory and which causes the carriage to be shifted.

A still further object is to provide an electronic typewriter which is capable of changing the arrangement of data which has already been stored in the memory.

DESCRIPTION OF PREFERRED EMBODIMENTS

Figure 1:
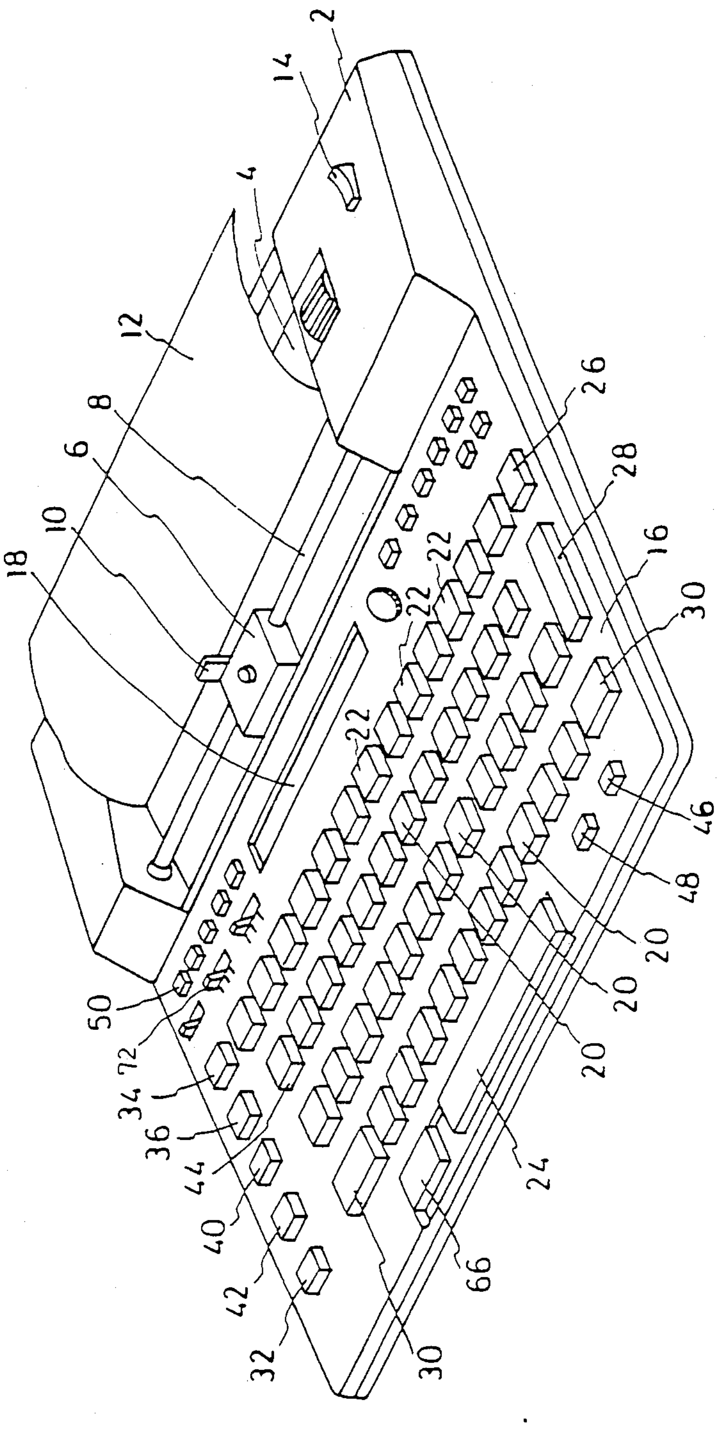
FIG. 1 is a perspective view depicting an electronic typewriter embodying the invention.

Turning now to FIG. 1, there is depicted an illustrative electronic typewriter of the invention. The typewriter comprises a body case 2, a platen 4, rotatably supported by body case 2, and a carriage 6, which is movable in parallel to the rotational center of platen 4. Carriage 6 is guided by a guide rod 8 supported in parallel to platen 4 by body case 2, and moved in the longitudinal direction of platen 4 by a drive device (not shown). A thermal head 10, as a print head, is fixed to carriage 6, and moved along a printing line on a thermal sensitive paper 12, as a printing paper, held on platen 4, when carriage 6 is moved as above described.

Carriage 6 is further rotated about guide rod 8 by another drive device (not shown) and this rotation moves thermal head 10 between a print position, whereat head 10 is pushed against paper 12, and a separate position, whereat head 10 is separated from paper 12. Platen 4 is likewise driven to rotate by a drive device, not shown, and feeds paper 12 in a direction perpendicular to the printing line. A power supply switch 14 is installed on body case 2.

In front of body case 2 is provided a keyboard 16 which has a liquid crystal display of, for example, 16 columns. On keyboard 16 are further arranged operational members, such as, keys, changeover switches, knobs and the like, for operating the typewriter. These operational members are, for example, alphabetic keys 20 for entering alphabetic characters; numeric keys for entering numeric characters of 1 through 9 and 0; a space key 24; a back space key 26; a carriage return key 28; a shift key 30; a second shift key 32; a left margin setting key 34; a right margin setting key 36; a tab setting key 40; a tab clear key 42; a tab key 44; a paper feed key 46; a paper return key 48; a repeat key 50; a code key 66; a mode selecting switch 72; and the like. Among these operational members, code key 66 is a key which is operated together with any of the above keys, so as to generate code data which are different from that generated when such key is operated solely.

The mode selecting switch 72 is a three position slide type switch which is used to select any of three modes, that is, a non-print mode, a collection print mode and a direct print mode. The non-print mode is a mode wherein entered characters or arithmetic results are displayed in display 18 without printing by head 10. The collection print mode is a mode wherein each of the characters entered, is displayed in display 18, and corrected, and characters which are overflowed from display 18 are sequentially printed on paper 12 by head 10. The direct print mode is a mode wherein characters which are entered are displayed in display 18 and printed on paper 12 by head 10 simultaneously with the entering. Since the other functions of the various keys are described in U.S. patent application Ser. No. 479,810 which is assigned to the same assignee as hereof, detailed description thereof is omitted hereat for sake of simplification of description.

Figure 2:
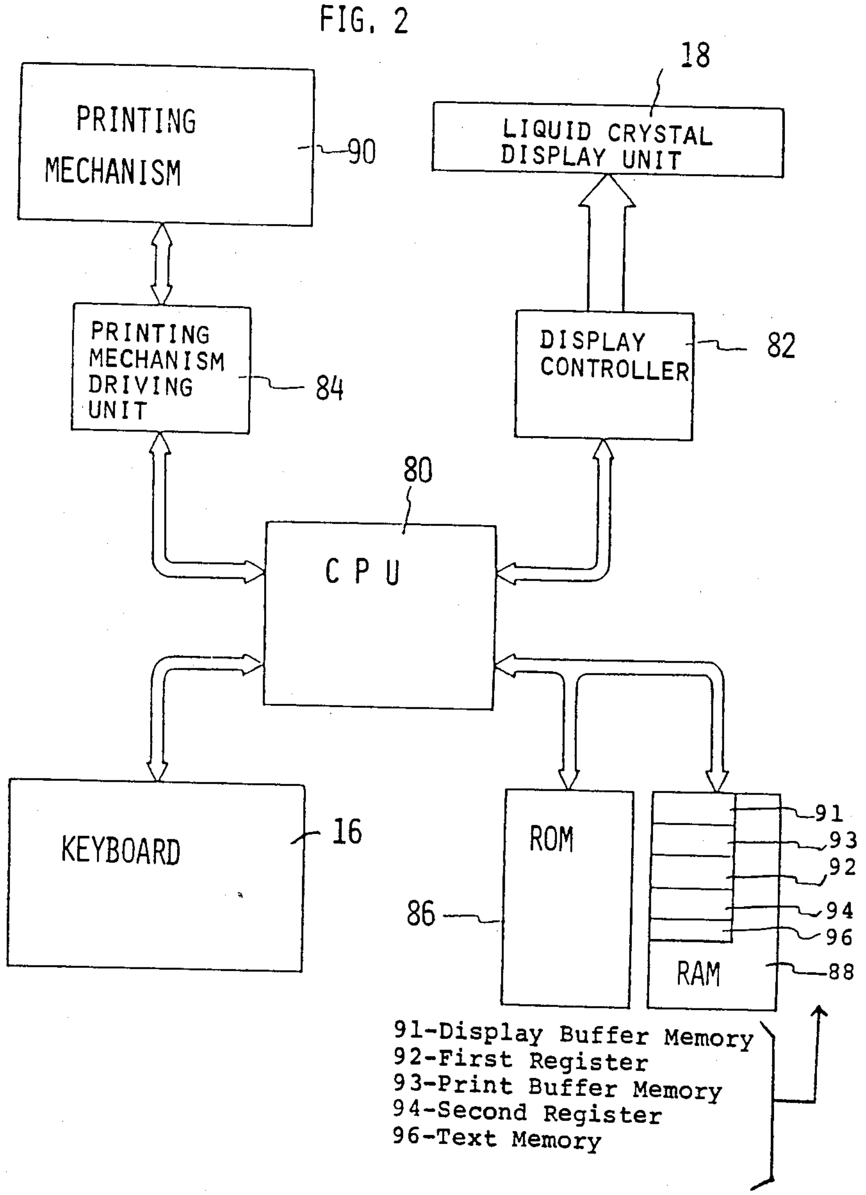
FIG. 2 is a block diagram depicting electronic circuit components used in the embodiment of FIG. 1.

FIG. 2 shows a block diagram of electronic circuit components which are used in the above typewriter. In FIG. 2, there is a central processing unit (CPU) 80, to which are connected keyboard 16, display controller 82, printing mechanism driver 84, read only memory (ROM) 86 and a random access memory (RAM) 88. Liquid crystal display 18 is connected to display controller 82 and the two together may be considered to constitute a display unit. A printing mechanism 90 is connected to printing mechanism driver 84 and the two together may be considered to constitute a printing unit. Printing mechanism 90 includes platen 4, carriage 6 and a drive device (not shown) to drive these as well as head 10.

RAM 88 is provided with a display buffer memory 91 having the same number of columns as that of display 18. CPU 80 stores code data in display buffer memory 91, in sequence. The code corresponds to alphabetic and numeric characters, spaces, arithmetic symbols and other symbols, as well as printing control symbols, such as, line feed symbol, paper feed symbol, and the like. These are entered from keyboard 16. CPU 80 reads out pattern data corresponding to code data from ROM 86, and supplies the code data to display controller 82. Display controller 82 is provided with a buffer memory having the same number of columns as that of display buffer memory 91 and makes display 18 indicate characters or printing control symbols based on the pattern data fed from CPU 80. RAM 88 is further provided with a printing buffer memory 93 corresponding to 20 characters to store printing data entered from keyboard 16.

Printing mechanism driver 84 drives head 10 of printer 90 according to the pattern data read out from ROM 86 by CPU 80 based on data stored in printing buffer memory 93. Printer driver 84 also drives a motor or the like, to drive carriage 6 and platen 4. A program to control operation of the typewriter as a whole, is also stored in the ROM 86.

RAM 88 is provided with a text memory 96 which can store about 2K bytes of data which are character data and function data, including printing control data. RAM 88 further comprises a first register 92 and a second register 94. First register 92 stores the position of head 10 (distance of head 10 from the original position represented by number of characters which can be printed). Second register 94 stores the value of the count content of first register 92, added by the number of characters, printing control symbols, and the like, stored in display buffer memory 91. In other words, second register 94 stores the position of print head 10, assuming that the characters, and the like, displayed in display 18, are all printed.

Figure 3:
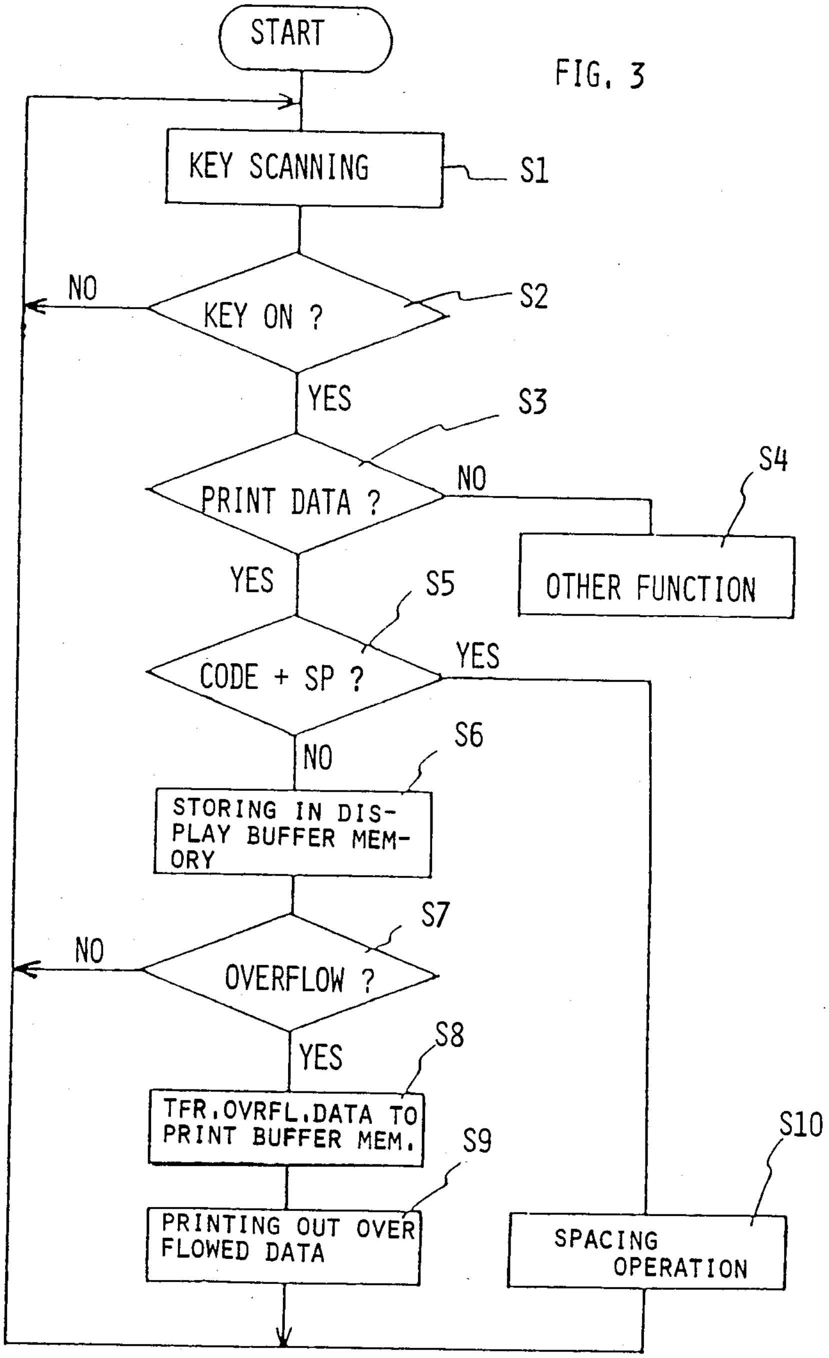
FIG. 3 is a flow chart depicting routines in the operation of the embodiment.

Operation of the embodiment will now be described with reference to the flow chart of FIG. 3. CPU 80 scans all the keys, after START, and at Step S1, and determines which key is operated every single cycle of scanning operation, at Step S2. As a result, when none of those keys is operated (i.e. NO) control sequence is returned to step S1, to repeat the scanning operation.

When the result in Step S2 is YES, CPU 80 determines whether or not the entered data is a print data, such as an alphabetic or numeral character, spacing or special spacing, by simultaneous operation of code key 66 and space key 24, and the like, at Step S3. If the entered data is not printing data (i.e. NO) another function, such as tab setting operation, carriage return operation, and the like, corresponding to the entered function data, is actuated at Step S4.

If the determination at Step S3 is YES, determination is made at Step S5, whether or not the entered data is a carriage shift instruction given by the simultaneous operation of code key 66 and space key 24. If the determination is NO, the entered printing data is stored in the lowest digit of display buffer memory 91, at Step S6, and each printing data which has been previously stored in display buffer memory 91 is shifted up by one digit.

As a result, determination is made at Step S7, whether or not there is any printing data which has overflowed the highest digit. When the determination is YES at step S7, the overflowed printing data is transferred to print buffer memory 93, at Step S8, and the overflowed data is printed out at Step S9. Then, the printing data is printed out at Step S9. When the printing data is a spacing code, it is apparent that print head 10 is not driven, while carriage 6 is only shifted by a space in the normal direction. After the process of step S9 has been completed, or the determination at Step S7 is NO, the control sequence is returned to Step S1, to repeat the scanning operation.

If the determination at Step S5 is YES, carriage 6 is shifted in the normal direction, at step S10, while the carriage shift instruction is not stored in display buffer memory 91. Then, control sequence is returned to START.

As described, the carriage is capable of being shifted directly without affecting data which already has been stored in display buffer memory 91 and displayed in display unit 18, when code key 66 and space key 24 are operated simultaneously. Consequently, the printing starting position of data which has been stored in display buffer memory 91 before the establishment of the correction printing mode, or at that mode, can optionally be shifted toward the right margin. Accordingly, when it is noticed that the data stored in the display buffer memory is to be paragraphed or centered after entering operation has been started, the data can be readily paragraphed or centered without clearing the data.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An electronic typewriter comprising a printer having a print head shiftable along a printing line of a recording sheet;

a driving unit for shifting said print head by a space corresponding to one character, in each printing line;

a keyboard provided with an arrangement of character keys, a space key, a code key, and function keys, to provide code data corresponding to said keys;

memory means for sequentially storing data entered from said keyboard;

means responsive to actuation of said code key to prohibit entry of data into said memory means while said code key is actuated;

a display unit for displaying data stored in said memory means;

control means for controlling said printer to print out sequentially on said recording paper only data overflowed from said display unit, upon entry of new data ; and shifting means, under the combined control of said control means, said code key and said space key, for operating only said driving unit to selectively shift said print head by a space in the character feed direction without any data being entered into said memory means, in response to simultaneous operation of said code key and said space key and after entry operation has started.

2. The typewriter of claim 1, wherein said display unit has a number of digits which are smaller than the number of digits corresponding to a single printing line.

3. The typewriter of claim 2, wherein said display unit comprises a liquid crystal display element.

4. The typewriter of claim 2, wherein said display unit is adapted to display newest data at a lowest digit, and to shift up preceding data.

5. The typewriter of claim 1, wherein said selective spacing is paragraphing.

* * * * *